(12) United States Patent
Zdroik

(10) Patent No.: US 7,083,065 B2
(45) Date of Patent: Aug. 1, 2006

(54) TANK ASSEMBLY

(75) Inventor: Michael J. Zdroik, Metamora, MI (US)

(73) Assignee: Millennium Industries Corporation, Auburn Hills, MI (US)

( * ) Notice: Subject to any disclaimer, the term of this patent is extended or adjusted under 35 U.S.C. 154(b) by 213 days.

(21) Appl. No.: 10/454,222

(22) Filed: Jun. 4, 2003

(65) Prior Publication Data

US 2004/0245253 A1    Dec. 9, 2004

(51) Int. Cl.
    *B65D 41/06*    (2006.01)
(52) U.S. Cl. ............... 220/562; 220/293; 220/300; 220/319
(58) Field of Classification Search ........ 220/562–564, 220/86.2, 86.3, 4.14, 293, 300, 319
    See application file for complete search history.

(56) References Cited

U.S. PATENT DOCUMENTS

| | | | |
|---|---|---|---|
| 3,470,907 A | 10/1969 | Shockey | |
| 4,212,318 A | 7/1980 | Warmbold | |
| 4,664,423 A | 5/1987 | Rowley | |
| 4,790,185 A | 12/1988 | Fedelem et al. | |
| 4,887,851 A * | 12/1989 | Rush et al. ............... 285/139.1 |
| 5,038,741 A | 8/1991 | Tuckey | |
| 5,111,858 A * | 5/1992 | Aittama et al. ............. 141/312 |
| 5,207,463 A * | 5/1993 | Seizert et al. ............ 292/256.6 |
| 5,364,134 A | 11/1994 | Anderson | |
| 5,826,918 A | 10/1998 | Bowles et al. | |
| 5,881,898 A | 3/1999 | Irwin et al. | |
| 6,019,127 A * | 2/2000 | Orita et al. ............... 137/515.7 |
| 6,192,869 B1 | 2/2001 | Hahner et al. | |
| 6,332,555 B1 | 12/2001 | Stangier | |
| 6,357,617 B1 * | 3/2002 | Kido .......................... 220/562 |
| 6,357,618 B1 | 3/2002 | Kloess et al. | |
| 6,386,244 B1 * | 5/2002 | Brown et al. ................... 141/1 |
| 6,435,365 B1 * | 8/2002 | Pachciarz et al. .......... 220/4.14 |
| 6,516,964 B1 * | 2/2003 | Gerhardt et al. ........... 220/4.14 |
| 2002/0096522 A1 | 7/2002 | Palvoelgyi et al. | |
| 2002/0108658 A1 | 8/2002 | Ootaka et al. | |
| 2002/0121517 A1 * | 9/2002 | Aoki et al. ................ 220/4.14 |
| 2002/0130515 A1 | 9/2002 | Mlyajima et al. | |

* cited by examiner

Primary Examiner—Joseph C. Merek
(74) Attorney, Agent, or Firm—Dykema Gossett PLLC

(57) ABSTRACT

A polymeric tank assembly is provided having a polymeric container with a neck opening. A ring with protruding barbs is inserted within the neck opening and the neck opening is placed in compression by a surround collar. The ring can be connected with clamping arms which can be engaged by a clamping ring which retains an instrument within the tank assembly.

20 Claims, 4 Drawing Sheets

TANK ASSEMBLY

FIELD OF THE INVENTION

The field of the present invention is that of polymeric tank assemblies and more particularly, plastic fuel tank assemblies.

BACKGROUND OF THE INVENTION

In many plastic molded tanks, such as fuel tanks, instrument and fluid fitting attachments are typically made by a welding process (hot plate welding, ultrasonic welding or friction welding) or by inserting a ring or component into a molding tool and overmolding around it to create a mechanical bond for retention. These processes are difficult in that they require inserting components into a hot tool or require complicated secondary operations for maintaining good plastic welding integrity.

In some molded tanks, such as those molded by roto-molding processes, which are typically used for low volume tanks (marine applications, motor cycles, other recreational vehicles), the material used cannot be welded after the molding process due to material degradation with low density polyethylene. Further complicating the above-noted factors is that many polymeric materials have the tendency to creep (move over time) or distort when exposed to liquid hydrocarbons such as gasoline, diesel oil or other vehicle fuels.

It is desirable to provide a polymeric tank assembly having a more reliable method of attaching various parts, such as nozzles, drop-in fuel pumps, and level indicators.

SUMMARY OF THE INVENTION

To make manifest the above noted and other desires, a revelation of the present invention is brought forth. The present invention provides a gas tank assembly having a mechanical joint created by pressing a ring into an inner surface of a mounting boss inner surface wall molded on the tank. The ring contains one or more barbs which engage the polymeric material. To avoid plastic movement and creep, a collar is installed opposite ring barbs, on an external surface of the mounting boss wall. To improve sealing, the ring insert can be spray coated with sealant such as Teflon® or inserted with an additional gasket or an O-ring.

The present inventive tank assembly can be used for large diameter mounting flanges, such as those used by fuel pump modules or smaller flanges used by tank instruments such as level sensors and emission valves. It can also be used for hose attachment connections (nipples) which require a precision molded part or metal tube instead of a hose attachment molded in the main tank body.

Other features and advantages of the present invention will be further understood after reviewing the accompanying drawings and detailed description.

BRIEF DESCRIPTION OF THE DRAWINGS

FIG. 3 is a perspective view partially sectioned of an alternate preferred embodiment fuel tank assembly according to the present invention.

DETAILED DESCRIPTION OF THE INVENTION

Figure 1:
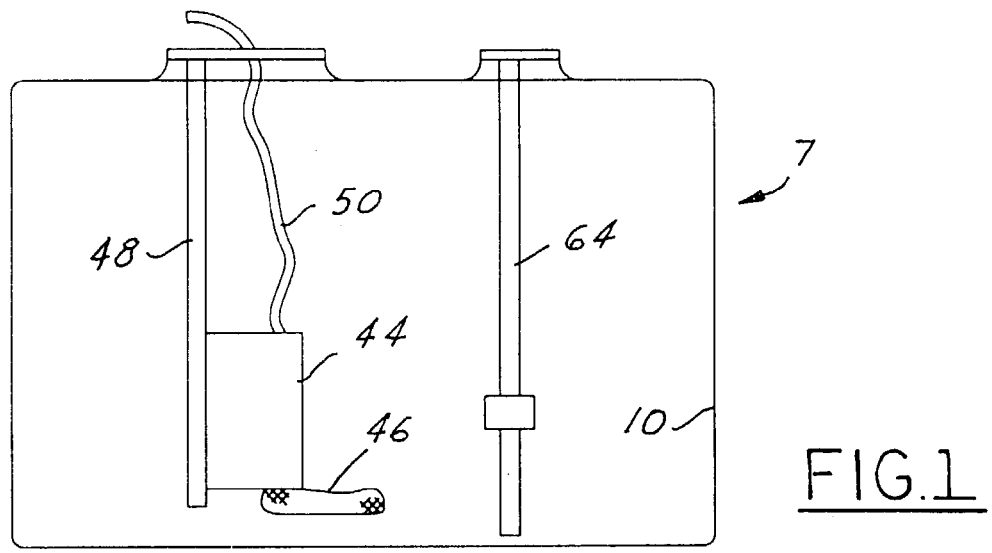
FIG. 1 is a schematic view of a tank assembly according to the present invention, with certain portions omitted for clarity of illustration.
Figure 2:
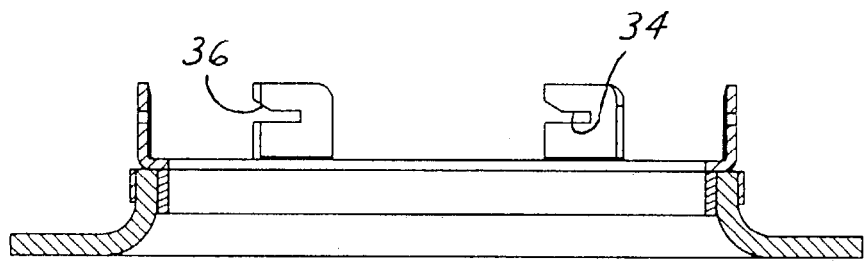
FIG. 2 is an enlargement of a portion of the tank assembly shown in FIG. 1.
Figure 3:
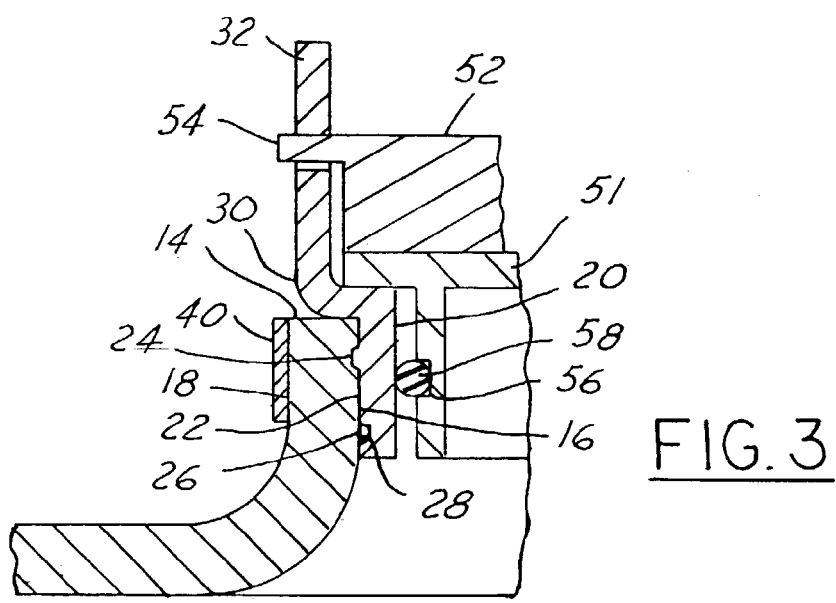
FIG. 3 is an enlargement of a portion of the tank assembly shown in FIG. 2.
Figure 4:
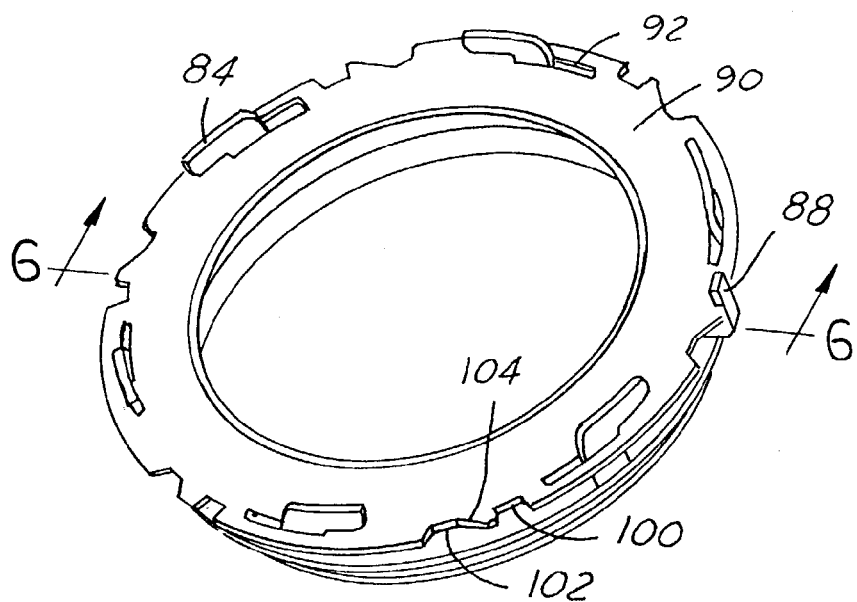
FIG. 4 is a sectional view of the fuel tank assembly shown in FIG. 3.
Figure 5:
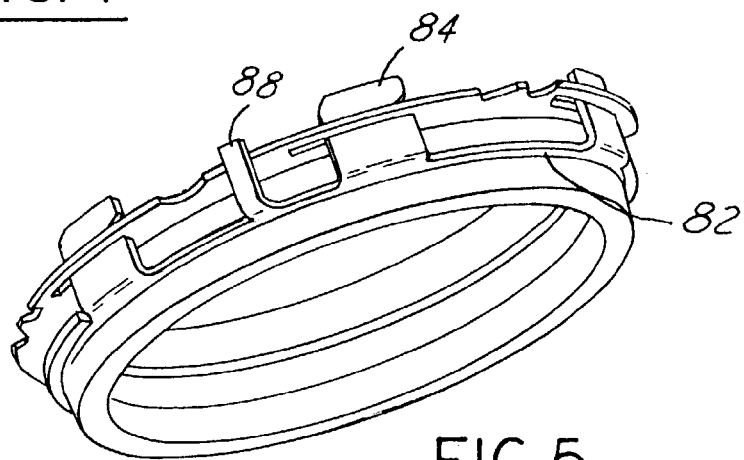
FIG. 5 is an enlargement of a portion of the fuel tank assembly shown in FIG. 5.
Figure 6:
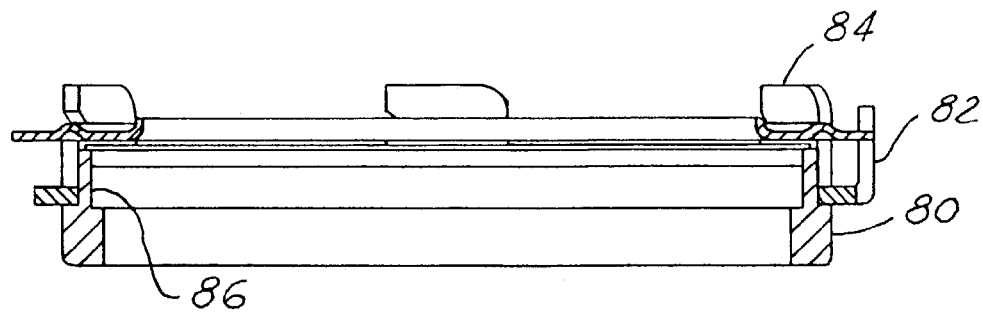
FIG. 6 is a sectional view taken along lines 6—6 of FIG. 4.
Figure 7:
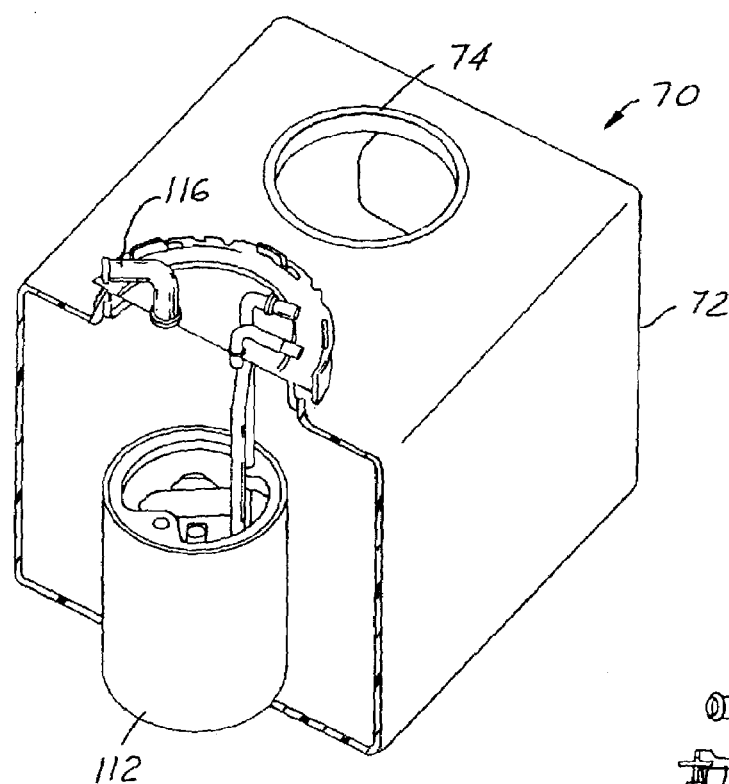
FIG. 7 is a perspective view of a bayonet-type fitting and locking ring utilizing the tank assembly shown in FIGS. 4–6.
Figure 8:
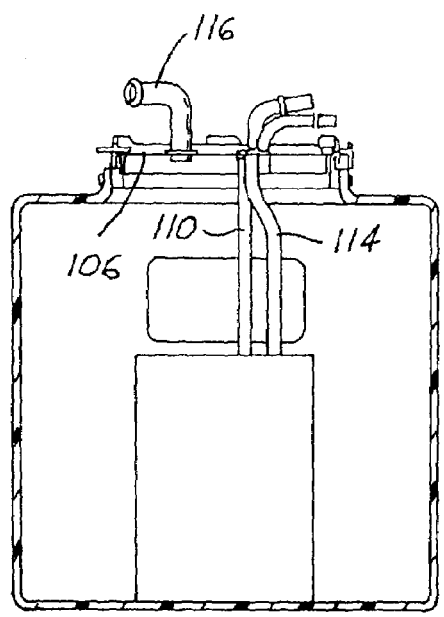
FIG. 8 is another perspective view of the locking ring and inner ring utilized in the fuel tank assembly of FIGS. 4–7.
Figure 9:
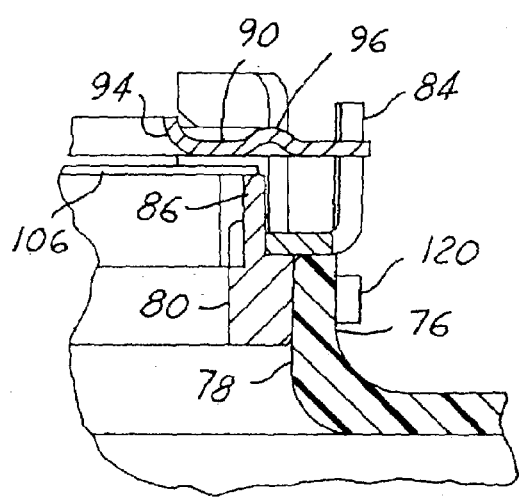
FIG. 9 is a partial enlarged sectional view of a portion of FIG. 7.

Referring to FIGS. 1–3, a gas tank assembly 7 is provided. The gas tank assembly 7 has a polymeric tank 10. The polymeric tank 10 will typically be a plastic, such as low density or high density polyethylene or other suitable material. The plastic may be blow molded or roto-molded and typical thickness dimensions will be 5–6 mm.

The tank 10 has an integrally formed boss or neck 14. The neck 14 will typically have a thickness of 5–6 mm. The neck 14 has an interior surface 16 and an exterior surface 18. Positioned closely adjacent to or preferably press fitted within the interior surface 16 is a ring 20. The ring 20 has an outer surface 22. Projecting from the outer surface 22 are a series of protrusions or barbs 24. The barbs 24 penetrate into the neck interior surface 16.

The ring 20 is typically fabricated from a metallic material. A sealing member 26 can be provided between the ring 20 and the neck interior surface 16. The sealing member may be a solid piece of material or a spray applied material. The sealing member can be Teflon® or other suitable material. Typically, a spray applied sealing member will be sprayed on the ring 20 before insertion into the neck 14. The ring may be generally straight along its surface adjacent the neck interior surface 16 or may have a slight angular groove indentation 28 for reception of the sealing member.

Fixably connected by brazing or welding, or manufactured integral to the ring 20 is a locking ring 30. The locking ring 30 has a series of geometrically spaced clamping arms 32. The clamping arms 32 have capture slots 34. The capture slots 34 have an angled opening 36.

Fitted over the neck exterior surface 18 is a collar 40. The collar 40 is typically sized to place the neck 14 in compression. The collar 40 may be an angular band which is press fitted over the neck exterior 18 or may be an adjustable clamping member which is tightened to place the neck 14 in compression. It is preferable that the ring 20 be more rigid than the collar 40.

The collar's compressive fitting is important for two reasons. First, some polymeric materials have a tendency to swell when exposed to certain hydrocarbon fluids. The tight fitting of the collar helps to overcome the swelling tendency. Second, the tight fitting of the collar 40 helps to ensure penetration of the barbs 24 into the polymeric material.

Referring to FIG. 1, the tank assembly 7 has an instrument, such as a fuel pump 44. The fuel pump 44 has an intake filter bag 46 connected thereto. The fuel pump is suspended by a post 48. The post 48 not only suspends the fuel pump within polymeric tank 10 but its interior also provides a conduit for wiring utilized to deliver power to the fuel pump which has a submersible motor.

The fuel pump 44 delivers fuel through a fuel line 50. The fuel line 50 and post 48 are connected with a module flange 51. The module flange 51 is pressed downward by a locking clamping ring 52. The clamping ring 52 has a cantilevered radially extending bayonet 54. The module flange has an angular groove 56 with an inserted sealing member or O-ring 58. Rotation of the clamping ring 52 causes the bayonet 54 to be inserted within the opening 36 of the capture slot and further rotation of the clamping ring causes the bayonet 54 to be slightly deformed and captured within the capture slot 34. The deformation of the bayonet 54 causes the clamping ring 52 to be urged downward, thereby clamping the module flange 51 into position. A similar arrangement as aforedescribed is provided for installation of a level sensor 64.

In another embodiment (not shown) the module flange can be manufactured integral with the clamping ring 52.

Referring to FIGS. 4–9, a tank assembly 70 is provided having a plastic fiber reinforced tank 72. The tank 72 has two openings with a neck 74. The neck 74 has an exterior surface 76 and an interior surface 78. A ring 80 is provided which is press fitted within the opening of the neck 74. The ring 80 is brazed or welded to a locking ring 82. The locking ring 82 can, if so desired, have an inner diameter that is press fitted upon a top portion 86 of the ring 80.

The locking ring 82 has a series of six geometrically spaced integrally connected clamping arms 84. The locking ring 82 also has an integrally joined retainer tab 88. The clamping arms 84 have slots similar to those aforedescribed in regards to the clamping arms 32.

Engaged by insertion and rotation thereof with the locking ring 82 is a locking clamping ring or plate 90. The clamping plate 90 is an annular member having a series of arcuate slots 92. The slots 92 are spaced to allow for their insertion over the clamping arms 84. The clamping plate 90 also has an inner diameter opening 94 which is flared generally conically upward. The clamping plate also has an annular ridge or mound 96.

To connect the clamping plate with the ring 80, the clamping plate is positioned to align the arcuate slots 92 with the clamping arms 84 and is dropped into position. After being dropped in position, the clamping plate 90 is torqued, bringing the mound 96 into engagement with the slots of the clamping arm 84, causing the mound 96 to be deformed downward and therefore clamped in position within the clamping arm slots.

The clamping plate also has a series of detent cutouts 100 and release cutouts 102. Upon rotation of the clamping plate 90, the retainer tabs 88 will typically be positioned within the cutouts 102. As the clamping plate 90 is further rotated, the retainer tabs 88 will engage with the ramps 104 of the release cutout until the retainer tab springs back into the detent cutout 100 preventing inadvertent releasing rotation of the clamping plate 90.

The clamping plate 90 clamps down on a module flange 106 by virtue of the interaction of the ridges with the slots in the locking arms 84. The module flange rests on the top portion 86 of the locking ring 80. The module flange 106 may have a sealant applied to its underside, or capture a sealing member (not shown) against locking ring 80. The force of the clamping plate 90 upon the module flange 106 may be sufficient to seal the module flange 106 with the locking ring 80. The module flange 106 is fixably connected with a post 110 which is connected with the fuel pump 112. A fuel line 114 fluidly connects the fuel pump 112 with the exterior of the tank assembly. The fuel line 114 is sealably connected with the module flange 106.

In similar fashion, electrical lines leading to the fuel pump 112 are fixably connected with the module flange 106 and a vent line 116 is connected with the insert plate 106 which delivers fumes to an emissions canister or to the vehicle emission control system.

In a manner similar to that previously described, the tank assembly 70 has a collar 120 which clamps to the exterior surface 78 of the neck 74.

Figure 10:
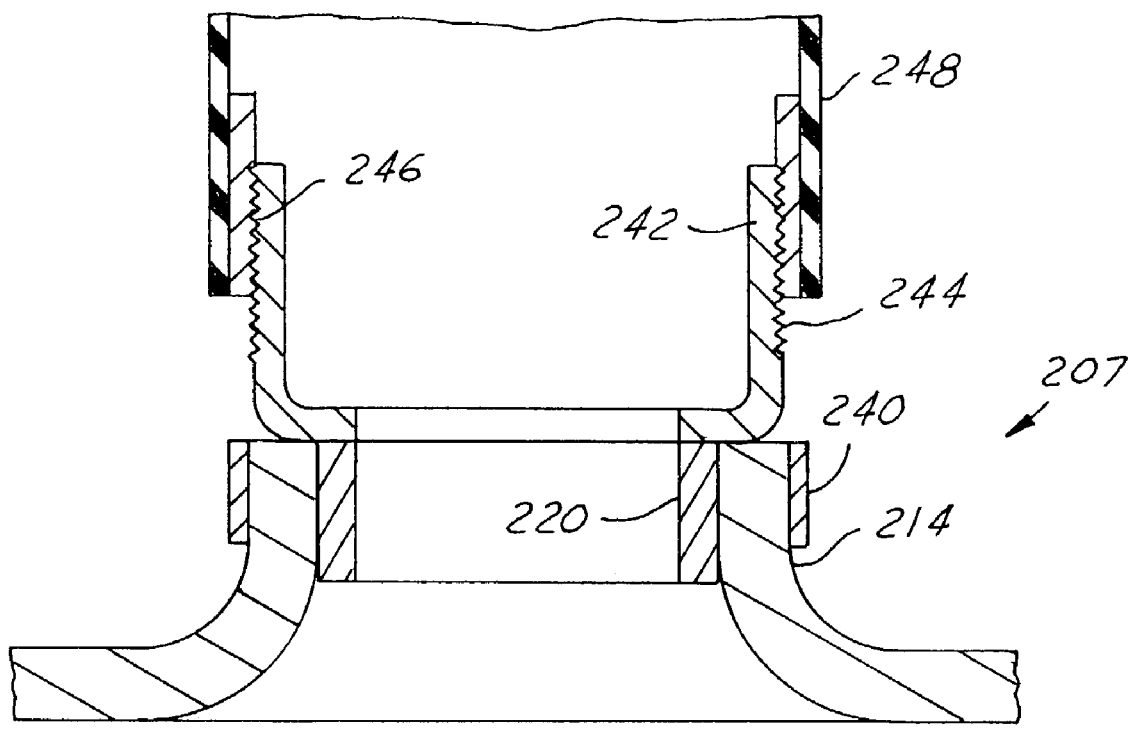
FIG. 10 is another alternate preferred embodiment of the present invention wherein a fluid connector is connected with a container of the tank assembly.

FIG. 10 provides a fuel tank assembly 207. The fuel tank assembly 207 has a neck 214, a ring 220 and a collar 240 similar to those aforedescribed. The tank assembly 207 additionally has a fluid tube fitting 242 which is fixably connected with the ring 220. The tube fitting 242 has an exterior threaded surface 244 to threadably engage with interior threads 246 provided by a fluid conduit provided by a hose 248.

In other embodiments (not shown) the fitting 242 may have female rather than male threads and the hose threads may be male rather than female. The fitting 242 can also be other fluid fittings such as elbows, nozzles, or valve seats as required.

While preferred embodiments of the present invention have been disclosed, it is to be understood that they have been disclosed by way of example only and that various modifications can be made without departing from the spirit and scope of the invention as it is explained by the following claims.

What is claimed is:

1. A polymeric tank assembly, comprising:
   a polymeric container having an opening neck with interior and exterior surfaces;
   a ring closely fitted within said neck interior surface with locking protrusions engaging with said neck and penetrating said neck interior surface, wherein said ring has a locking ring connected thereto, and wherein said locking ring has a clamping arm connected thereto; and
   a collar fitted over said neck exterior surface with a portion opposite said ring protrusions, placing said neck in compression.

2. A tank assembly as described in claim 1, wherein said polymeric material is plastic.

3. A tank assembly as described in claim 2, wherein said plastic swells when exposed to a liquid hydrocarbon.

4. A tank assembly as described in claim 1, wherein said polymeric material is blow molded.

5. A tank assembly as described in claim 1, wherein said polymeric material is roto-molded.

6. A tank assembly as described in claim 1, further including a sealing member between said ring and said neck interior surface.

7. A tank assembly as described in claim 6, wherein said sealing member is spray-applied.

8. A tank assembly as described in claim 6, wherein said sealing member is made from a Teflon® material.

9. A tank assembly as described in claim 1, wherein said ring is more rigid than said collar.

10. A tank assembly as described in claim 1, wherein said ring is press fitted within said neck.

11. A tank assembly as described in claim 1, having a fluid fitting fixably connected with said ring.

12. A tank assembly as described in claim 11, wherein said fluid fitting is threaded for threaded connection with a fluid conduit.

13. A tank assembly as described in claim 1, wherein an instrument insert for said tank is connected with said tank by rotating a clamping plate which interlocks with said clamping arm.

14. A fuel tank assembly as described in claim 13, wherein said clamping plate clamps down on a module flange and wherein said instrument is connected with said module flange.

15. A polymeric tank assembly comprising:
   a polymeric container having an opening neck with interior and exterior surfaces;
   a ring closely fitted within said neck interior surface with protrusions penetrating said neck interior surface;
   a collar fitted over said neck exterior surface placing said neck in compression;
   said ring being connected with a locking ring having connected thereto a clamping arm; and
   a clamping ring for connection to said tank by rotating and interlocking with said clamping arm.

16. A tank assembly as described in claim 15, wherein said clamping ring has slots for receiving said clamping arm and wherein said clamping ring has a series of mounds brought into engagement with slots of the clamping arm causing said clamping ring to clamp down.

17. A tank assembly as described in claim 16, wherein said clamping ring has a retainer tab preventing inadvertent rotation of the clamping ring.

18. A tank assembly as described in claim 15, wherein a module flange is pushed down by said clamping ring.

19. A tank assembly as described in claim 18, wherein said module flange is connected with an instrument positioned in said polymeric container.

20. A tank assembly as described in claim 1, wherein said collar is an endless ring.

* * * * *